UNITED STATES PATENT OFFICE.

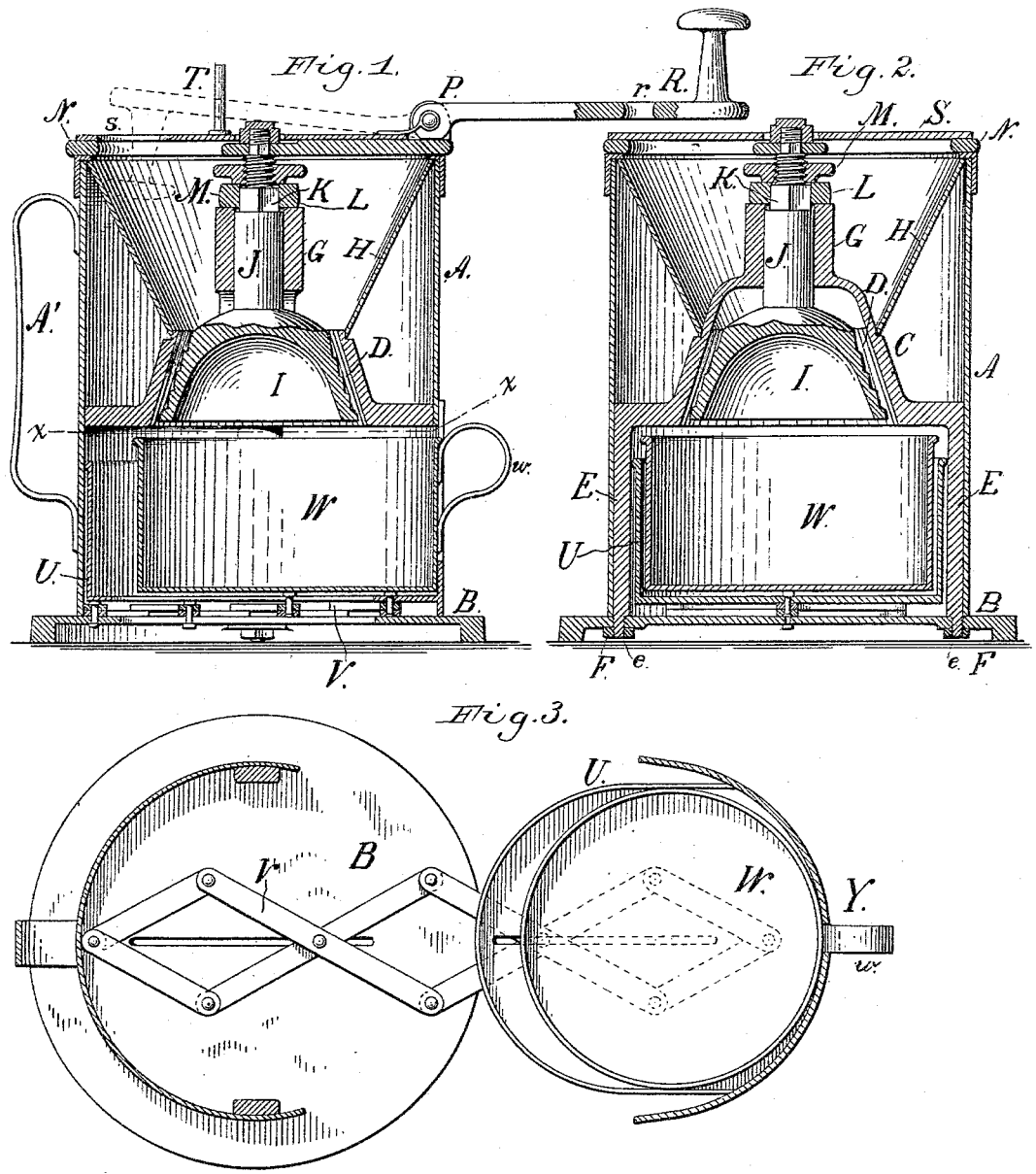

CHARLES A. BERGTOLD, OF NEW YORK, N. Y.

GRINDING-MILL.

SPECIFICATION forming part of Letters Patent No. 411,571, dated September 24, 1889.

Application filed November 2, 1888. Serial No. 289,797. (No model.)

*To all whom it may concern:*

Be it known that I, CHARLES A. BERGTOLD, a citizen of the United States, residing at New York city, in the county of New York and State of New York, have invented new and useful Improvements in Grinding-Mills, of which the following is a specification.

My invention relates especially to devices employed for grinding coffee, spice, &c., and has for its object the provision of a mill cheap and simple to construct, easy to use and regulate, and not liable to get out of order.

To attain the desired end my invention involves certain novel and useful combinations or arrangements of parts and peculiarities of construction and operation, all of which will be hereinafter first fully described, and then pointed out in the claim.

In the drawings, Figure 1 is a vertical sectional view, and Fig. 2 is a similar view at right angles to Fig. 1. Fig. 3 is a horizontal sectional view at line X X of Fig. 1.

Like letters of reference indicate corresponding parts.

A is a body or cylindrical shell of the device, mounted upon a base B and provided with a handle A'.

C is a metal shell, serrated upon its inner surface at D and secured to the base B by means of legs E, having screw-threaded ends e, wherewith engage nuts F. Projecting above shell C is a sleeve G, surmounted by a hopper H.

I is a serrated conical shell provided with an upwardly-projecting shaft J, having a square shoulder K, whereon fits a washer or bearing-plate L. Above said bearing-plate a thumb-nut M engages with a screw-thread upon shaft I. By this means the position of the grinding-surfaces may be nicely and accurately regulated.

Fixed to the upper end of shaft I is a revoluble ring N, which rests upon the edge of case A.

At P is hinged an operating-crank R, which takes the position indicated by a full line in Fig. 1 when in use and when not in use the position indicated by the dotted lines in said figure.

S is a cover which fits on the top of the cylinder A, said cover being perforated at S for the reception of the knob of the operating-crank.

r is a perforation through which the pin T passes when the crank is turned back, said pin being employed for lifting the cover as well as holding the crank in place when closed.

U is a drawer placed beneath the grinding mechanism and connected to the base B by lazy-tongs V, as particularly illustrated in Fig. 3.

W is a receptacle having a handle w projecting through a slot Y in front of the drawer.

When thus constructed and arranged, my improved coffee and spice mill is admirably adapted to the use and purposes for which it is intended. It is neat, compact, and durable, easily regulated, and not liable to get out of order or become disarranged.

Having now described my invention, what I claim as new therein, and desire to secure by Letters Patent, is—

The combination, with the cylinder A, mounted upon a base-piece B and containing the grinding mechanism, of the receptacle-support secured to the base by lazy-tongs, substantially as shown and described.

In testimony that I claim the foregoing I hereunto set my hand in the presence of two witnesses.

CHARLES A. BERGTOLD.

Witnesses:
A. M. PIERCE,
C. HOLMES.